United States Patent
Endou et al.

(10) Patent No.: US 7,256,507 B2
(45) Date of Patent: Aug. 14, 2007

(54) INVERTER CONTROLLED GENERATOR SET

(75) Inventors: Masahiko Endou, Numazu (JP); Masanori Nakagawa, Numazu (JP); Kaoru Shinba, Numazu (JP); Katsumi Yamamoto, Numazu (JP); Yoshihiro Sugisawa, Numazu (JP)

(73) Assignee: Kokusan Denki Co., Ltd., Numazu-shi (JP)

( * ) Notice: Subject to any disclaimer, the term of this patent is extended or adjusted under 35 U.S.C. 154(b) by 0 days.

(21) Appl. No.: 11/508,081

(22) Filed: Aug. 22, 2006

(65) Prior Publication Data

US 2006/0279087 A1 Dec. 14, 2006

Related U.S. Application Data

(62) Division of application No. 10/911,262, filed on Aug. 4, 2004, now Pat. No. 7,123,495.

(30) Foreign Application Priority Data

Aug. 5, 2003 (JP) ............... 2003-286863

(51) Int. Cl.
*F02D 31/00* (2006.01)
*F02D 35/00* (2006.01)
*F02N 11/06* (2006.01)
*H02P 9/04* (2006.01)

(52) U.S. Cl. .................. 290/40 A; 290/40 R (58) Field of Classification Search .............. 290/40 A, 290/40 R, 40 E, 40 B, 40 C; 322/28, 37; 363/40, 37, 34, 98, 131
See application file for complete search history.

(56) References Cited

U.S. PATENT DOCUMENTS

| 4,973,896 | A | | 11/1990 | Shiga et al. |
| 5,371,412 | A | | 12/1994 | Iwashita et al. |
| 5,519,305 | A | * | 5/1996 | Nomura ........................ 322/14 |
| 5,545,928 | A | | 8/1996 | Kotani |

(Continued)

FOREIGN PATENT DOCUMENTS

JP 05-018285 1/1993

(Continued)

*Primary Examiner*—Julio Gonzalez R.
(74) *Attorney, Agent, or Firm*—Pearne & Gordon LLP (57) ABSTRACT

An inverter controlled generator set including: a power supply unit that uses a generator driven by an engine as a power supply to output a DC voltage; an inverter device that converts the output voltage of the power supply unit into an AC voltage; and a rotational speed control unit that controls a rotational speed of the engine so as to be kept at a target rotational speed suitable for a load applied to the inverter device, wherein the rotational speed control unit is comprised so that a settling time when the rotational speed of the engine is caused to converge to the target rotational speed in a state where the load is above a set value is longer than a settling time when the rotational speed is caused to converge to the target rotational speed in a state where the load is below the set value, in order to minimize an operation sound of the engine when the load is intermittently driven.

4 Claims, 6 Drawing Sheets

U.S. PATENT DOCUMENTS

| | | |
|---|---|---|
| 5,992,950 A | 11/1999 | Kumar et al. |
| 6,121,691 A | 9/2000 | Renner |
| 6,414,400 B1 | 7/2002 | Scott et al. |
| 6,441,506 B2 * | 8/2002 | Nakashima ............... 290/40 C |
| 6,740,986 B2 | 5/2004 | Shimizu et al. |
| 6,879,053 B1 | 4/2005 | Welches et al. |
| 6,894,401 B2 * | 5/2005 | Beeson et al. ............. 290/1 A |
| 2001/0020789 A1 * | 9/2001 | Nakashima ............... 290/40 C |
| 2002/0175521 A1 * | 11/2002 | Dunsworth et al. ....... 290/40 A |
| 2003/0209909 A1 | 11/2003 | Fukaya et al. |

FOREIGN PATENT DOCUMENTS

| | | |
|---|---|---|
| JP | 2000-217398 | 8/2000 |

* cited by examiner

United States Patent US 7,256,507 B2

INVERTER CONTROLLED GENERATOR SET

CROSS-REFERENCE TO RELATED APPLICATION

This application is a divisional of U.S. patent application Ser. No. 10/911,262, filed on Aug. 4, 2004 now U.S. Pat. No. 7,123,495 claiming priority of Japanese Patent Application No. 2003-286863, filed on Aug. 5, 2003.

TECHNICAL FIELD OF THE INVENTION

The present invention relates to an engine driven inverter controlled generator set including a power supply unit that uses a generator driven by an engine as a power supply to generate a DC voltage, and an inverter device that converts the output of the power supply unit into an AC voltage.

BACKGROUND OF THE INVENTION

A power supply device that uses a generator driven by an engine as a power supply is disclosed in, for example, Japanese Patent Application Laid-Open Publication No. 2000-217398 and Japanese Patent Application Laid-Open Publication No. 5-18285, which includes: a power supply unit that uses the generator as the power supply to output a DC voltage; an inverter device that converts the DC output of the power supply unit into an AC output at a fixed frequency; and an engine rotational speed control unit that controls a rotational speed of the engine so as to be kept at a target rotational speed suitable for a load applied to the inverter device. The target rotational speed is a rotational speed of the engine required for generating a necessary output for driving the load from the inverter device.

When an AC generator is used as a generator, a power supply unit is comprised of the AC generator and a converter that converts an AC output to a DC output.

The inverter device is comprised of a known bridge type inverter circuit, each side of a bridge including switch elements and feedback diodes connected anti-parallel to the switch elements, and an inverter control unit that controls on/off of the switch elements that constitute the inverter circuit at a predetermined timing so as to output an AC voltage at a predetermined frequency from the inverter circuit.

The engine rotational speed control unit provided in the conventional inverter controlled generator set includes, for example, a target rotational speed setting unit that sets a target rotational speed of the engine according to the size of the load of the inverter, a rotational speed detection unit that detects a rotational speed of the engine, a deviation detection unit that detects a deviation between the detected rotational speed and the arithmetically operated target rotational speed, an operation amount arithmetical operation unit that arithmetically operates an operation amount of an intake air amount adjusting unit (for example, a throttle valve) of the engine required for bringing the deviation to zero by performing a proportional arithmetical operation (a P arithmetical operation), a proportional plus integral plus derivative arithmetical operation (a PID arithmetical operation), or a proportional plus integral arithmetical operation (a PI arithmetical operation) of the detected deviation, and an operation unit that operates the intake air amount adjusting unit of the engine by the amount of operation arithmetically operated by the operation amount arithmetical operation unit, and the engine rotational speed control unit uses feedback to control the rotational speed of the engine so as to bring the deviation to zero between the rotational speed of the engine and the target rotational speed.

The inverter controlled generator set, including the engine rotational speed control unit that sets the target rotational speed suitable for the size of the load and use feedback to control the rotational speed of the engine so as to bring the deviation to zero between the rotational speed of the engine and the target rotational speed as described above, has the following problem when intermittently driving a load requiring a large starting current, for example, an electric power tool or the like.

For an inverter controlled generator set that drives a load requiring a large starting current such as an electric power tool, when an operator drives the load, an engine rotational speed control unit sharply increases a rotational speed of an engine to about an upper limit value to allow an inverter to pass a large starting current through the load. When the operator then stops the operation, the load is eliminated, and thus the engine rotational speed control unit sharply reduces the rotational speed of the engine to a lower limit value (usually an idling rotational speed). When the rotational speed of the engine is sharply increased and reduced, the engine makes a loud operation sound. The load intermittently driven such as the electric power tool is repeatedly started and stopped in a relatively short cycle, and thus if an engine driven inverter controlled generator set is used for driving such a load, a significant variation of the rotational speed of the engine frequently causes a loud operation sound. The operation sound of the engine and an operation sound made by the load itself produce a loud noise, which annoys the operator or people around.

SUMMARY OF THE INVENTION

Therefore, an object of the invention is to provide an engine driven inverter controlled generator set that can suppress an operation sound made by an engine when a load is intermittently driven, and minimize an influence of noise on an operator or people around.

The invention is applied to an inverter controlled generator set including: a power supply unit that uses a generator driven by an engine as a power supply to output a DC voltage; an inverter device that converts the output voltage of the power supply unit into an AC voltage; and an engine rotational speed control unit that controls a rotational speed of the engine so as to be kept at a target rotational speed suitable for a load applied to the inverter device. In the invention, the engine rotational speed control unit is comprised so that a settling time of the rotational speed when the rotational speed is caused to converge to the target rotational speed in a state where no load above a set value being applied to the inverter device is detected (including a state where the load is zero) is longer than a settling time of the rotational speed when the rotational speed is caused to converge to the target rotational speed in a state where a load above the set value is applied to the inverter device.

According to a preferable aspect of the invention, the engine rotational speed control unit is comprised so as to feedback control the rotational speed of the engine so as to bring a deviation between the rotational speed of the engine and the target rotational speed to zero, when the load above a set value being applied to the inverter device is detected, and stepwise reduce the rotational speed by a predetermined range of reduction at fixed time intervals to reduce the rotational speed toward the target rotational speed, when no load above the set value being applied to the inverter device is detected.

The range of reduction of the rotational speed when the rotational speed is stepwise reduced may be fixed or increased with time.

According to another preferable aspect of the invention, the engine rotational speed control unit is comprised so as to feedback control the rotational speed of the engine so as to bring a deviation between the rotational speed of the engine and the target rotational speed to zero when the load above a set value being applied to the inverter device is detected, and smoothly reduce the rotational speed toward the target rotational speed when no load above the set value being applied to the inverter device is detected.

As described above, the engine rotational speed control unit is comprised so that the settling time of the rotational speed when the rotational speed is caused to converge to the target rotational speed in the state where no load above the set value being applied to the inverter device is detected is longer than the settling time of the rotational speed when the rotational speed is caused to converge to the target rotational speed in the state where the load above the set value is applied to the inverter device, thus minimizing a variation sound of the engine caused when the load is intermittently driven, to reduce noise and prevent annoying an operator or people around.

BRIEF DESCRIPTION OF THE DRAWINGS

The above and other objects and features of the invention will be apparent from the detailed description of the preferred embodiment of the invention, which are described and illustrated with reference to the accompanying drawings, in which.

DETAILED DESCRIPTION OF THE PREFERRED EMBODIMENTS

Figure 1:
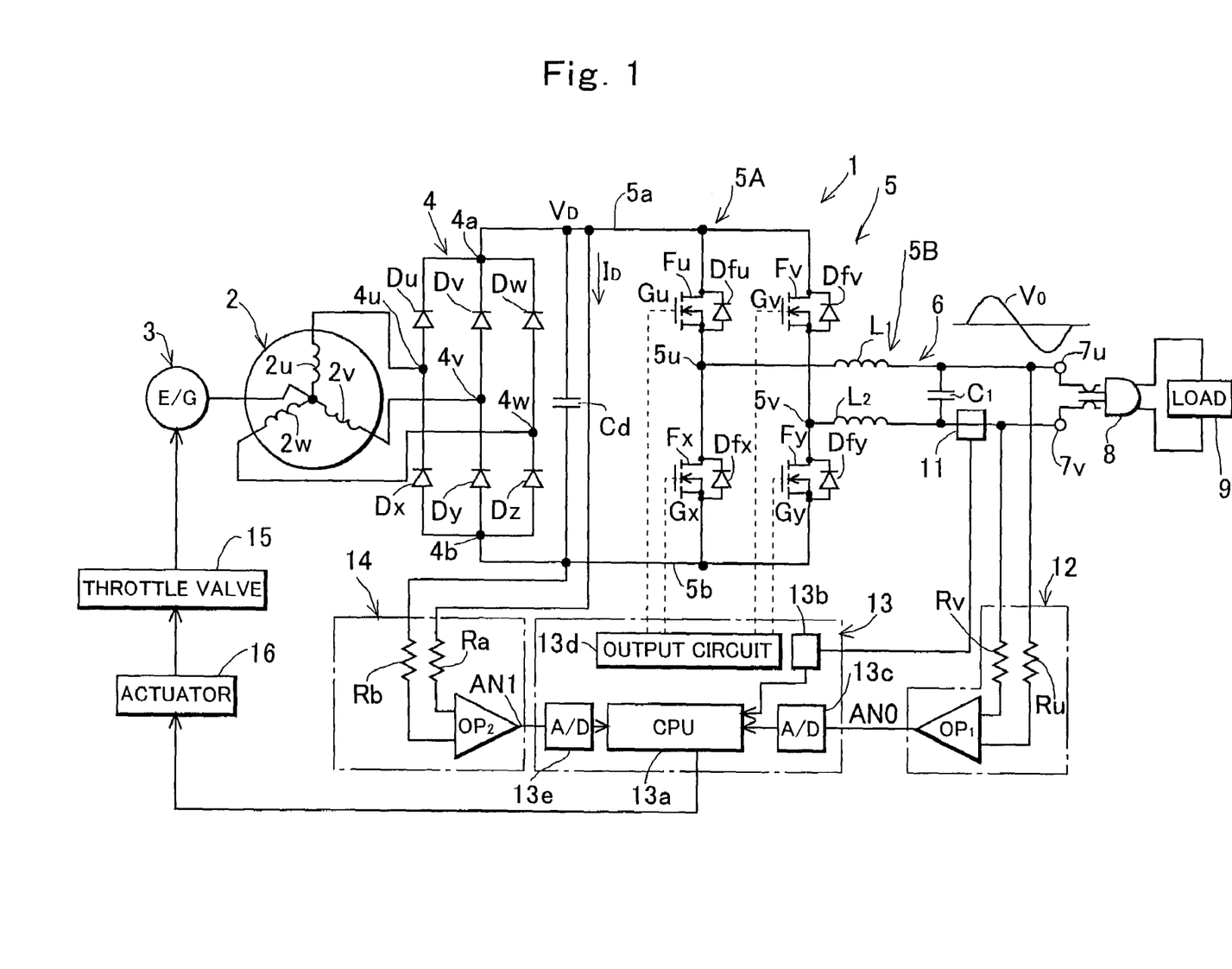
FIG. 1 is a circuit diagram of an example of a construction of a hardware part of an engine driven inverter controlled generator set according to the invention.

FIG. 1 shows an example of a construction of an inverter controlled generator set 1 according to the invention. In FIG. 1, a reference numeral 2 denotes a three-phase magneto AC generator, and 3 denotes an engine that drives the magneto generator 2. The magneto AC generator 2 includes many magnetic rotors (not shown), and a stator having three-phase connected generation coils 2u to 2w, and the unshown magnetic rotors are mounted to a crankshaft of the engine 3.

A reference numeral 4 denotes a converter constituted by a rectifier constructed by three-phase bridge connecting diodes Du to Dw and Dx to Dz. Three-phase output terminals of the generator 2 are connected to three-phase AC input terminals 4u to 4w of the converter 4, and a power supply capacitor Cd is connected across DC output terminals 4a and 4b of the converter 4.

In the shown example, a power supply unit that uses the generator driven by the engine as a power supply to output a DC voltage is comprised of the generator 2, the engine 3, the converter 4, and the power supply capacitor Cd.

A reference numeral 5A denotes a full-bridge type inverter circuit (a power conversion circuit) using MOSFETs Fu and Fv, Fx and Fy as switch elements, and in the inverter circuit, an H bridge circuit is constructed by a first arm and a second arm connected in parallel, the first arm including the MOSFETs Fu and Fx connected in series and the second arm including the MOSFETs Fv and Fy connected in series. In this example, the MOSFETs Fu and Fv constitute switch elements in upper rows of the first arm and the second arm, respectively, and the MOSFETs Fx and Fy constitute switch elements in lower rows of the first arm and the second arm, respectively.

Parasitic diodes Dfu and Dfv, Dfx and Dfy, each having an anode facing the source, are formed across drain and source of the MOSFETs Fu and Fv, Fx and Fy. In the embodiment, the parasitic diodes are used as feedback diodes connected in anti-parallel to the switch elements that constitute the sides of the bridge of the inverter circuit. A pair of input terminals 5a and 5b of the inverter circuit 5A are connected to the output terminals 4a and 4b of the converter 4, and a pair of output terminals 5u and 5v of the inverter circuit 5A are connected to a pair of load connecting terminals 7u and 7v, respectively, through a low-pass filter circuit 5B constituted by inductances L1 and L2 and a capacitor C1. A load 9 such as an electric power tool is connected to the load connecting terminals 7u and 7v through a known connector 8 including a receptacle and a plug.

In this example, an inverter device 5 that converts the DC output provided from the power supply unit into an AC output is comprised of the inverter circuit 5A and the filter circuit 5B.

A reference numeral 11 denotes a load current detection circuit that detects a current supplied from the inverter circuit 5A through a filter circuit 6 to the load, 12 denotes a load voltage detection circuit that includes an operational amplifier OP1, and resistances Ru and Rv connecting input terminals of the operational amplifier to the load connecting terminals 7u and 7v, and an output of the load current detection circuit 11 and an output of the load voltage detection circuit 12 are input to a controller 13.

The controller 13 includes a microprocessor having a CPU 13a and a ROM, a RAM, a timer, or the like, an input circuit 13b that inputs the output of the load current detection circuit 11 to the CPU 13a, an A/D converter 13c that converts the output of the load voltage detection circuit 12 into a digital signal and inputs the signal to the CPU 13a, a drive signal output circuit 13d that provides drive signals Gu, Gv, Gx, and Gy to gates of the FETs Fu, Fv, Fx, and Fy according to a PWM signal generated by the CPU, and an A/D converter 13e that converts a detection value of an output voltage of the converter 4 provided from a below described detection circuit into a digital signal and inputs the signal to the CPU 13a.

The voltage across the output terminals of the converter 4 (the output voltage of the power supply unit) is applied to input terminals of an operational amplifier OP2 through resistances Ra and Rb, and an output of the operational amplifier OP2 is input to the A/D converter 13e in the controller 13. A power supply output detection circuit 14 that detects the output voltage of the power supply unit is comprised of the resistances Ra and Rb and the operational amplifier OP2.

A reference numeral 15 denotes a throttle valve provided in an intake pipe of the engine, 16 denotes an actuator that operates the throttle valve 15, and a drive current is provided from the CPU 13a through a drive circuit 17 to the actuator 16.

Figure 2:
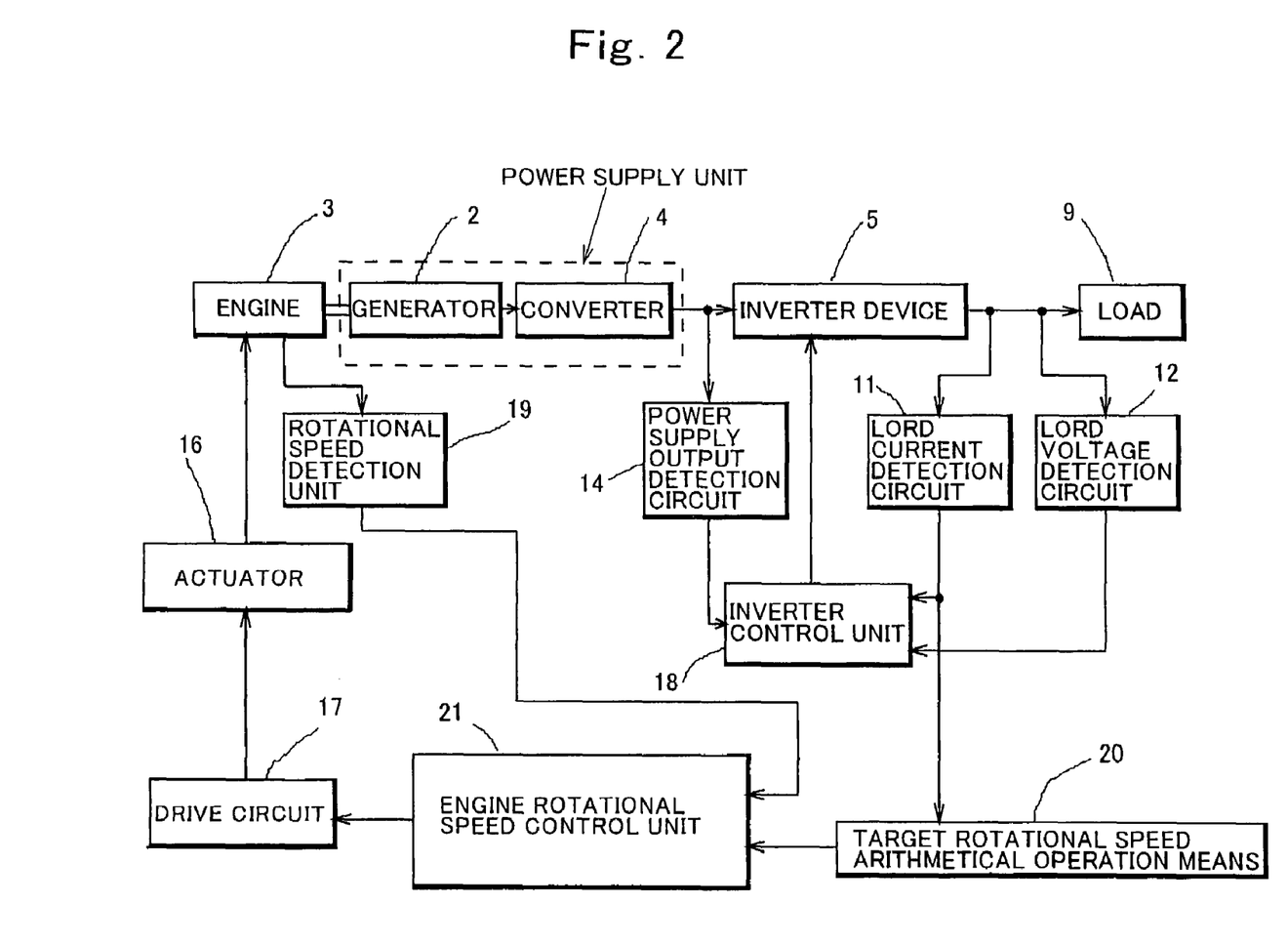
FIG. 2 is a block diagram of an example of a construction of a control system provided in the inverter controlled generator set in FIG. 1.

FIG. 2 is a block diagram of a construction of a control system provided in the inverter controlled generator set according to the embodiment in FIG. 1. In FIG. 2, a reference numeral 18 denotes an inverter control unit that controls the inverter circuit 5A of the inverter device 5 with respect to the output voltage of the converter 4 detected by the power supply output detection circuit 14, a load voltage detected by the load voltage detection circuit 12, and a load current detected by the load current detection circuit 11. A reference numeral 19 denotes a rotational speed detection unit, which is mounted to the engine 3 to detect the rotational speed from an output of a signal generating device (not shown) that generates a pulse at a predetermined rotational angle position of the crankshaft. A reference numeral 20 denotes target rotational speed arithmetical operation means, which determines the size of the load 9 from the load current detected by the load current detection circuit 11 to arithmetically operate a target rotational speed of the engine suitable for the load. A reference numeral 21 denotes an engine rotational speed control unit that controls so as to cause the rotational speed detected by the rotational speed detection unit 19 to converge to the target rotational speed arithmetically operated by the target rotational speed arithmetical operation means 20.

The inverter control unit 18, the rotational speed detection unit 19, the target rotational speed arithmetical operation means 20, and the engine rotational speed control unit 21 are constructed by causing the CPU 13a to execute a predetermined program.

The CPU 13a reads data AN1 of the DC output voltage of the power supply unit obtained from the converter 4 through the operational amplifier OP2 of the power supply output detection circuit 14 and the A/D converter 13e, and reads instantaneous data AN0 that indicates an instantaneous value of the AC voltage across the load connecting terminals 7u and 7v through the load voltage detection circuit 12 and the A/D converter 13c.

The inverter control unit 18 interrupts the program executed by the CPU every time a switch timing appearing in a fixed PWM cycle Δt is detected, calculates a duty ratio determined by the output voltage of the power supply unit (AN1) and the instantaneous value of a sinusoidal reference voltage at the switch timing appearing in each PWM cycle Δt (a duty ratio required for outputting a sinusoidal AC voltage), and set an ON time of the switch element in the timer in the CPU based on the calculated duty ratio. The PWM signal is set to a high level while the timer is counting the set ON time, and the PWM signal is set to zero when the counting operation by the timer is completed. In this way, the inverter control unit provides a drive signal in a PWM modulated waveform from the CPU through the drive signal output circuit 13d to the switch elements Fu, Fv, Fx, Fy of the inverter circuit 5A, and turns on/off the switch elements to output the sinusoidal AC voltage from the filter circuit 5B.

When the output of the power supply unit is input to the inverter circuit 5A to PWM control the switch elements, thereby obtaining a single-phase AC voltage having a peak value of VA across the load connecting terminals 7u and 7v, if the output voltage of the power supply unit is VB, the duty ratio D of the switch element at the switch timing appearing in each PWM cycle Δt can be calculated by the following formula by using a voltage correction value Kv=VA/VB provided in the form of a ratio between voltages VA and VB, $$D=\mathrm{Sin}(2\pi n\Delta t/T)\times Kv \tag{1}$$

where n is a value that indicates an ordinal position of the PWM cycle from a zero cross point of a rising edge of an AC voltage waveform, and provided by a count of a counter for a PWM cycle. Δt is a PWM cycle, and T is a time for one cycle of the AC voltage across the load connecting terminals.

The inverter control unit 18 uses the count n of the counter, the read data AN1 of the output voltage of the rectifier, and the output voltage VA of the power supply unit that provides the peak value to calculate the duty ratio D by the formula (1), or uses a duty arithmetical operation map stored in advance in the ROM to calculate the duty ratio D, every time the PWM cycle is detected from the count of the counter that counts clock pulses.

The inverter control unit detects the switch timing appearing in each fixed PWM cycle Δt by the count n of the counter that counts clock pulses. Then, the inverter control unit interrupts the program executed by the CPU every time the switch timing is detected, calculate the duty ratio of the switch element at each switch timing, and set the ON time of the switch element in the timer in the CPU based on the calculated duty ratio D. The PWM signal is set to the high level while the timer is counting the set ON time, and the PWM signal is set to zero when the counting operation by the timer is completed. In this way, the inverter control unit provides the drive signal in the PWM modulated waveform from the CPU through the drive signal output circuit 13d to the switch elements Fu, Fv, Fx, Fy of the inverter circuit.

A user may connect any load across the load connecting terminals 7u and 7v. Loads that may be connected by the user include a capacitive load, an inductive load, or a load that performs a switching operation so as to intermittently pass a current through the load connecting terminals. Even if the switch elements of the inverter circuit are controlled so as to obtain the AC voltage in a reference waveform across the load connecting terminals, some loads may cause distortion of the output waveform to increase a distortion factor of the output voltage waveform.

Thus, the inverter control unit 18 according to the embodiment reads, in the CPU, the data AN0 that provides the instantaneous value of the voltage across the load connecting terminals, corrects the duty ratio so as to increase the duty ratio of the drive signal when the data AN0 is smaller than the reference data that provides the instantaneous value of the reference voltage, and reduce the duty ratio of the drive signal when the instantaneous data AN0 is larger than the reference data to bring a deviation between the instantaneous value of the voltage detected by the load voltage detection circuit 12 and the instantaneous value of the reference voltage to zero.

The duty ratio D' corrected as described above is obtained by the following formula.

$$D' = D + G \times (ANS - AN0) \times Kc \qquad (2)$$

where ANS is reference data, which is an instantaneous value of the reference waveform at each switch timing. G is a gain that determines a ratio of correction to the difference between the reference data ANS and the data AN0. The gain G is usually set to 1 or less.

A coefficient Kc is a coefficient by which a correction value is multiplied in order to convert a correction value of the instantaneous data of the voltage across the load connecting terminals [G×(ANS−AN0)] into a correction value to the duty ratio at that time, and determined by Kv.

The engine rotational speed control unit 21 controls so as to cause the rotational speed of the engine detected by the rotational speed detection unit 19 to converge to the target rotational speed arithmetically operated by the target rotational speed arithmetical operation means 20. In the invention, the engine rotational speed control unit 21 is comprised so that a settling time of the rotational speed when the rotational speed of the engine is caused to converge to the target rotational speed in a state where no load above a set value being applied to the inverter device 5 is detected is longer than a settling time of the rotational speed when the rotational speed is caused to converge to the target rotational speed in a state where a load above the set value is applied to the inverter device 5.

Figure 3:
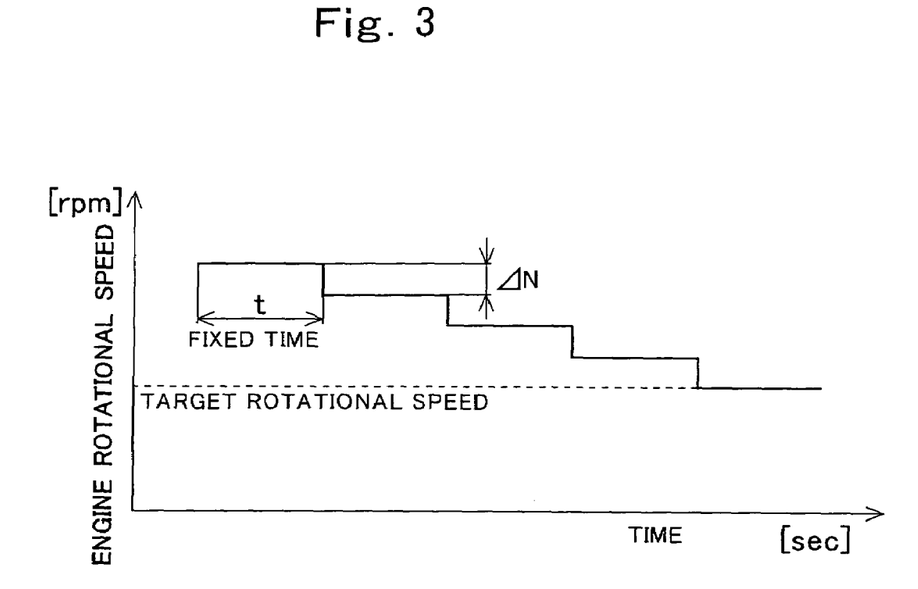
FIG. 3 is a time chart of an example of variation with time of an engine rotational speed when a load is sharply reduced in the inverter controlled generator set in FIG. 1.

For such control, the engine rotational speed control unit 21 is comprised so as to perform conventional feedback control for controlling the rotational speed of the engine so as to bring a deviation to zero between the rotational speed of the engine detected by the rotational speed detection unit 19 and the target rotational speed arithmetically operated by the target rotational speed arithmetical operation means 20 when the load above the set value being applied to the inverter device 5 is detected, and stepwise reduce the rotational speed of the engine by a predetermined range of reduction ΔN at fixed time intervals t as shown in FIG. 3, by using a preset minimum rotational speed (usually an idling speed) as a target rotational speed, to gradually reduce the rotational speed so as to converge to the target rotational speed, when no load above the set value being applied to the inverter device (including a state where the load is zero) is detected.

Figure 6:
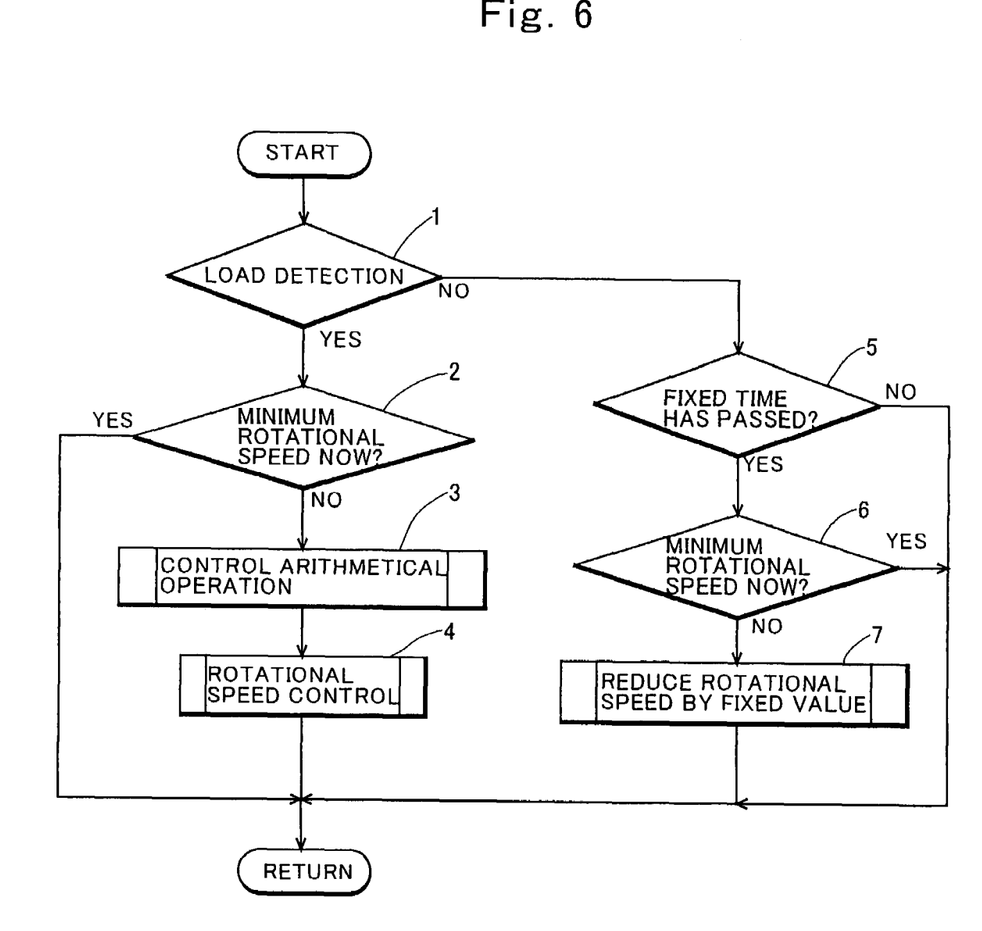
FIG. 6 is a flowchart of an example of an algorithm of a program executed by a microprocessor that constitutes a control unit in the inverter controlled generator set in FIG. 1.

FIG. 6 shows a flowchart of an algorithm of a task executed by the CPU at fixed time intervals (for example, at each time interval of 80 msec) in order to construct the engine rotational speed control unit 21 that performs such control. According to the algorithm in FIG. 6, in Step 1, it is determined whether a load current above a set value (a threshold) is detected by the load current detection circuit 11, and when the load current above the set value is detected, it is determined in Step 2 whether the present rotational speed detected by the rotational speed detection unit 19 is a preset minimum rotational speed (usually an idling speed). When the present rotational speed is not reduced to the preset minimum rotational speed, the process goes to Step 3, control arithmetical operations are performed such as an arithmetical operation of a deviation between the target rotational speed arithmetically operated with respect to the load current detected by the load current detection circuit 11 and the present rotational speed, or an arithmetical operation for calculating the size of a drive current to be passed through the actuator 16 so as to bring the deviation to zero by performing a P arithmetical operation, a PI arithmetical operation, or a PID arithmetical operation of the deviation. Then, in Step 4, the drive current of the arithmetically operated size is passed through the actuator to match the rotational speed of the engine with the target rotational speed.

When it is determined in Step 2 that the present rotational speed is reduced to the minimum rotational speed, no processing is performed thereafter to finish the task.

When it is determined in Step 1 that no load current above the set value is detected (substantially no load is applied to the inverter), the process goes to Step 5, and it is determined whether a fixed time has passed since no load current above the set value was detected. When it is determined that the fixed time has not passed, no processing is performed thereafter to finish the task. When it is determined in Step 5 that the fixed time has passed since no load current above the set value was detected, the process goes to Step 6, and it is determined whether the present rotational speed is the set minimum rotational speed. When the present rotational speed is not the minimum rotational speed (higher than the minimum rotational speed), the process goes to Step 7, and the rotational speed of the engine is reduced by a fixed value ΔN to finish the task. When this task is performed again after the rotational speed of the engine is reduced in Step 7, and the process goes to Step 5, it is determined whether a fixed time has passed since previous rotational speed was reduced by ΔN. When it is determined that the fixed time has passed since previous rotational speed was reduced by ΔN, the process goes to Step 6, and it is determined whether the rotational speed is reduced to the minimum rotational speed. When it is determined in Step 6 that the rotational speed is not reduced to the minimum rotational speed, in Step 7, the rotational speed is reduced by the fixed value ΔN. In this way, when it is determined that no load above the set value is applied to the inverter, the rotational speed of the engine is stepwise reduced by the fixed value ΔN at fixed intervals until the rotational speed of the engine is reduced to the minimum rotational speed, and gradually caused to converge to the target rotational speed (the minimum rotational speed).

The set value for determining the reduction of the load is appropriately set according to a current passing through the load when the operation of the load is stopped. If the current passing from the inverter device through the load becomes zero when the operation of the load (for example, the electric power tool) is stopped, the set value is set to zero. When some load current passes even when the operation of the load is stopped, the set value is set substantially equal to the load current passing when the operation of the load is stopped.

For control according to the algorithm in FIG. 6, load determination means is constructed by Step 1 for determining whether the size of the load applied to the inverter device is above the set value, and rotational speed determination means is constructed by Step 2 for determining whether the rotational speed of the engine is reduced to the preset minimum rotational speed (usually an idling speed) when the load determination means determines that the load above the set value is applied to the inverter device. On-load rotational speed control means is constructed by Steps 3 and 4 for controlling so as to bring the deviation between the rotational speed detected by the rotational speed detection unit 19 and the target rotational speed arithmetically operated by the target rotational speed arithmetical operation means 20 to zero when it is determined that the rotational speed of the engine is not reduced to the minimum rotational speed. No-load state duration measurement means is constructed by Step 5 for measuring a duration when no load is applied, when the load determination means determines that no load above the set value is applied to the inverter device. Further, no-load state rotational speed gradual reduction control means is constructed by Steps 6 and 7 for stepwise reducing the rotational speed by a predetermined range of reduction at fixed intervals to reduce the rotational speed toward the target rotational speed when no load above the set value being applied to the inverter device is detected.

Specifically, the engine rotational speed control unit 21 according to the embodiment includes the load determination means for determining that the size of the load applied to the inverter device is above the set value, the rotational speed determination means for determining whether the rotational speed of the engine detected by the rotational speed detection unit is reduced to the preset minimum rotational speed when the load determination means determines that the load above the set value is applied to the inverter device, the on-load rotational speed control means for controlling so as to bring the deviation between the rotational speed of the engine and the target rotational speed arithmetically operated by the target rotational speed arithmetical operation means to zero when it is determined that the rotational speed of the engine detected by the rotational speed detection unit is not reduced to the minimum rotational speed, the no-load state duration measurement means for measuring a duration when no load is applied, when the load determination means determines that no load above the set value is applied to the inverter device, and no-load state rotational speed gradual reduction control means for stepwise reducing the rotational speed by the predetermined range of reduction at fixed intervals to reduce the rotational speed toward the target rotational speed when no load above the set value being applied to the inverter device is detected.

Figure 4:
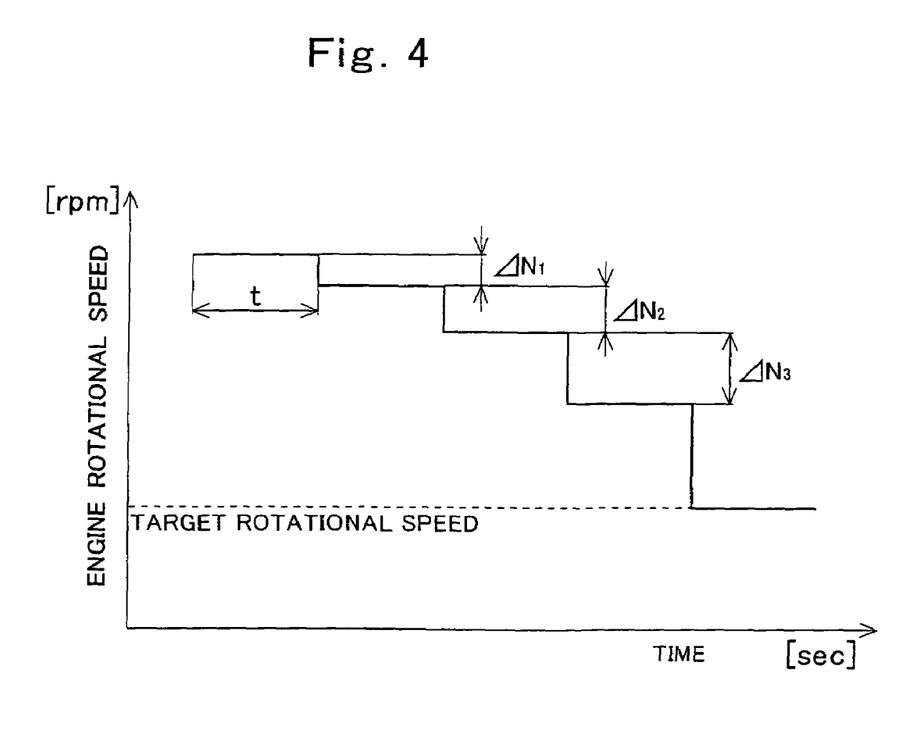
FIG. 4 is a time chart of another example of variation with time of the engine rotational speed when the load is sharply reduced in the inverter controlled generator set in FIG. 1.

According to the above described embodiment, the rotational speed is stepwise reduced by the predetermined range of reduction at fixed intervals when no load above the set value being applied to the inverter device is detected, but as shown in FIG. 4, the range of reduction of the rotational speed when the rotational speed is stepwise reduced may be increased with time.

Figure 7:
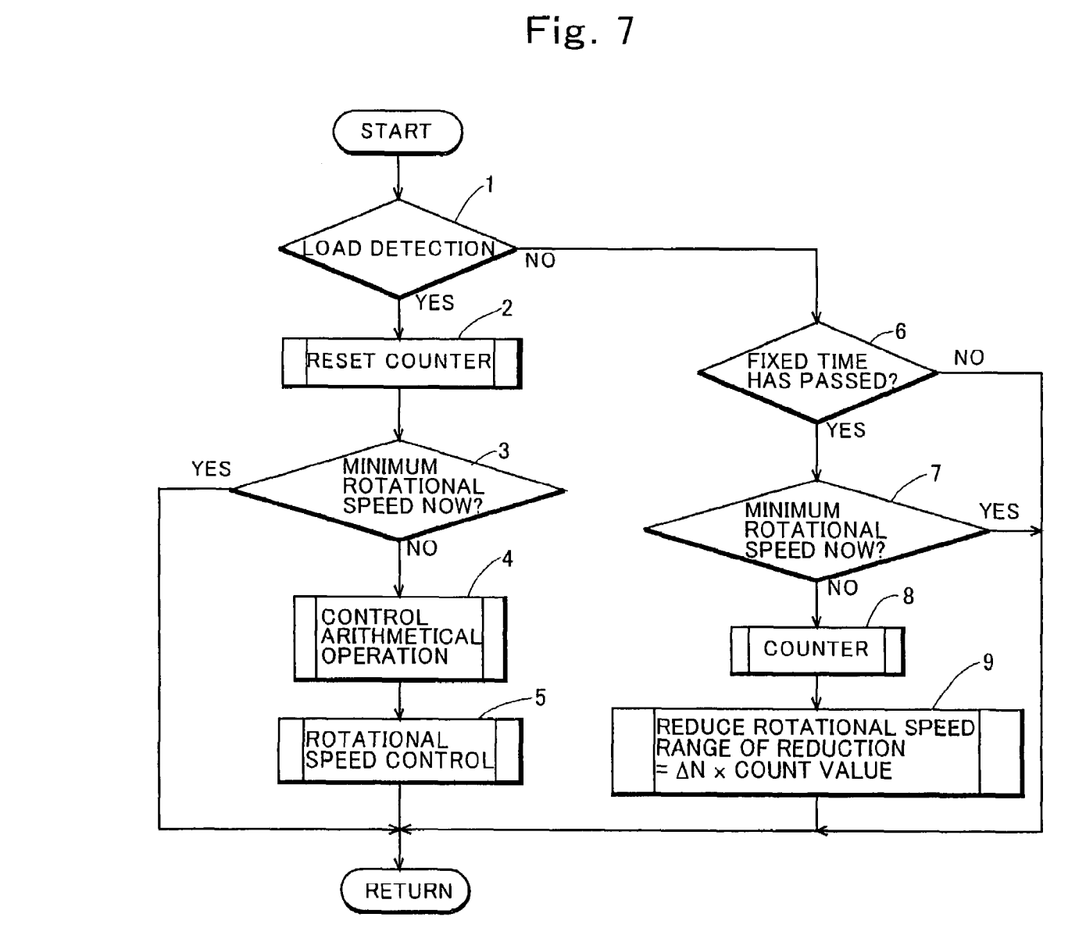
FIG. 7 is a flowchart of another example of an algorithm of a program executed by the microprocessor that constitutes the control unit in the inverter controlled generator set in FIG. 1.

FIG. 7 shows an example of an algorithm of a task executed by the CPU at fixed intervals for control in FIG. 4. According to the algorithm in FIG. 7, first in Step 1, it is determined whether a load current above a set value (a threshold) is detected by the load current detection circuit 11, and when the load current above the set value is detected, the counter is reset in Step 2, and it is determined in Step 3 whether the present rotational speed detected by the rotational speed detection unit 19 is a preset minimum rotational speed. When the present rotational speed is not reduced to the minimum rotational speed, the process goes to Step 4, control arithmetical operations are performed such as an arithmetical operation of a deviation between the target rotational speed arithmetically operated with respect to the load current detected by the load current detection circuit 11 and the present rotational speed, or an arithmetical operation for calculating the size of a drive current to be passed through the actuator 16 in order to bring the deviation to zero by performing a P arithmetical operation, a PI arithmetical operation, or a PID arithmetical operation of the deviation. Then, in Step 5, the drive current of the arithmetically operated size is passed through the actuator to match the rotational speed of the engine with the target rotational speed.

In Step 3, when it is determined that the present rotational speed is reduced to the minimum rotational speed, no processing is performed thereafter to finish the task.

In Step 1, when it is determined that no load current above the set value is detected (substantially no load is applied to the inverter), the process goes to Step 6, and it is determined whether a fixed time has passed since no load current above the set value was detected. When it is determined that the fixed time has not passed, no processing is performed thereafter to finish the task. When it is determined in Step 6 that the fixed time has passed since no load current above the set value was detected, the process goes to Step 7, and it is determined whether the present rotational speed is the set minimum rotational speed. When the present rotational speed is higher than the minimum rotational speed, the count of the counter is incremented by one in Step 8, then the process goes to Step 9, and the rotational speed of the engine is reduced by a range of reduction determined by the product of a fixed value $\Delta N$ and the count of the counter to finish the task. When this task is performed again after the rotational speed of the engine is reduced in Step 9, and if the process goes to Step 6, it is determined whether a fixed time has passed since previous rotational speed was reduced by the predetermined range of reduction ($\Delta N \times$count). When it is determined that the fixed time has passed, the process goes to Step 7, and it is determined whether the rotational speed is reduced to the minimum rotational speed. When it is determined that the rotational speed is not reduced to the minimum rotational speed, the count of the counter is increased in Step 8, and then in Step 9, the rotational speed is reduced by the predetermined range of reduction ($\Delta N \times$count). In this way, when it is determined that no load above the set value is applied to the inverter, the rotational speed of the engine is stepwise reduced at fixed intervals until the rotational speed of the engine is reduced to the minimum rotational speed, and gradually caused to on verge to the target rotational speed (the minimum rotational speed).

According to the algorithm in FIG. 7, load determination means is constructed by Step 1 for determining whether the size of the load applied to the inverter device is above the set value, and rotational speed determination means is constructed by Step 3 for determining whether the rotational speed of the engine is reduced to the preset minimum rotational speed when the load determination means determines that the load above the set value is applied to the inverter device. On-load rotational speed control means is constructed by Steps 4 and 5 for controlling so as to bring the deviation between the rotational speed detected by the rotational speed detection unit and the target rotational speed arithmetically operated by the target rotational speed arithmetical operation means to zero when it is determined that the rotational speed of the engine is not reduced to the minimum rotational speed. No-load state duration measurement means is constructed by Step 6 for measuring a duration when no load is applied, when the load determination means determines that no load above the set value is applied to the inverter device. Further, no-load state rotational speed gradual reduction control means is constructed by Steps 7 to 9 for stepwise reducing the rotational speed while increasing a range of reduction of the rotational speed with time at fixed intervals to reduce the rotational speed toward the target rotational speed, when no load above the set value being applied to the inverter device is detected.

The construction of the engine rotational speed control unit 21 according to this embodiment is the same as that by the algorithm in FIG. 6, except that no-load state rotational speed gradual reduction control means is comprised so as to stepwise reduce the rotational speed while increasing the range of reduction of the rotational speed with time at fixed intervals to reduce the rotational speed toward the target rotational speed, when no load above the set value being applied to the inverter device is detected.

Figure 5:
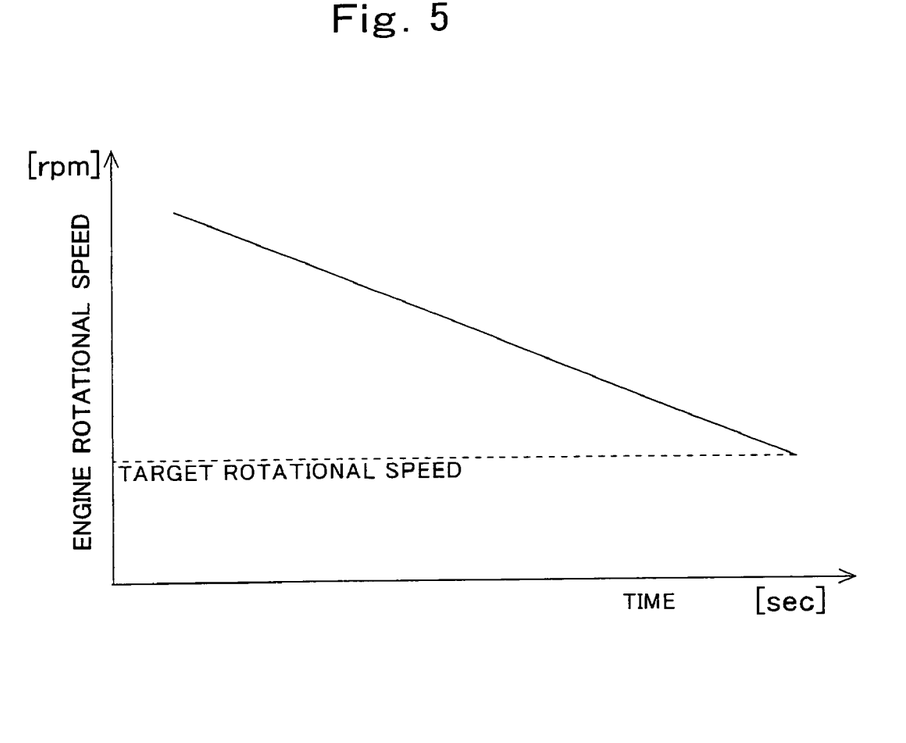
FIG. 5 is a time chart of a further example of variation with time of the engine rotational speed when the load is sharply reduced in the inverter controlled generator set in FIG. 1.

According to the above described embodiment, the rotational speed of the engine is stepwise reduced by the predetermined range of reduction at fixed intervals to reduce the rotational speed of the engine toward the target rotational speed when no load above the set value being applied to the inverter device is detected, but as shown in FIG. 5, the rotational speed of the engine may be smoothly reduced with time when no load above the set value being applied to the inverter device is detected.

In the example in FIG. 5, the rotational speed of the engine is linearly reduced with time when no load above the set value being applied to the inverter device is detected, but the way to reduce the rotational speed when no load above the set value being applied to the inverter device is detected is not limited to this, and for example, the rotational speed of the engine may be exponentially reduced with time.

In the above described embodiment, the load current is detected on the output side of the inverter device, but the load current may be detected on the inverter circuit side by providing a current detector such as a shunt resistor between the negative DC input terminal 5*b* of the inverter circuit and the negative output terminal 4*b* of the converter.

In the above described embodiment, the load applied to the inverter device is detected from the output of the load current detection circuit, but the size of the load is reflected in the size of the output voltage VD of the converter 4, and thus the size of the load may be detected from the output voltage VD of the converter.

In the converter 4, when a thyristor is used as a rectification element that rectifies the output of the generator to control a conducting angle of the thyristor, thereby keeping the output voltage of the converter at a fixed value, the load state of the inverter device may be detected from the conducting angle of the thyristor.

Although a preferred embodiment of the invention has been described and illustrated with reference to the accompanying drawings, it will be understood by those skilled in the art that it is by way of example, and that various changes and modifications may be made without departing from the spirit and scope of the invention, which is defined only to the appended claims.

What is claimed is:

1. An engine driven inverter controlled generator set comprising:
    a power supply unit that uses a generator driven by an engine as a power supply to output a DC voltage;
    an inverter device that converts the output voltage of said power supply unit into an AC voltage; and
    an engine rotational speed control unit that controls a rotational speed of said engine so as to be kept at a target rotational speed suitable for a load applied to said inverter device,
    wherein said engine rotational speed control unit is comprised so as to feedback control the rotational speed of said engine so as to bring a deviation between the rotational speed of said engine and the target rotational speed to zero when the load above a set value being applied to said inverter device is detected, and stepwise reduce said rotational speed by a predetermined range of reduction at fixed time intervals to reduce said rotational speed toward the target rotational speed when no load above the set value being applied to said inverter device is detected.

2. The engine driven inverter controlled generator set according to claim 1, wherein the range of reduction of the rotational speed when said rotational speed is stepwise reduced is fixed.

3. The engine driven inverter controlled generator set according to claim 1, wherein the range of reduction of the rotational speed when said rotational speed is stepwise reduced is increased with time.

4. An engine driven inverter controlled generator set comprising:
    a power supply unit that uses a generator driven by an engine as a power supply to output a DC voltage;
    an inverter device that converts the output voltage of said power supply unit into an AC voltage; and
    an engine rotational speed control unit that controls a rotational speed of said engine so as to be kept at a target rotational speed suitable for a load applied to said inverter device,
    wherein said engine rotational speed control unit is comprised so as to feedback control the rotational speed of said engine so as to bring a deviation between the rotational speed of said engine and the target rotational speed to zero when the load above a set value being applied to said inverter device is detected, and smoothly reduce said rotational speed toward the target rotational speed when no load above the set value being applied to said inverter device is detected.

* * * * *